United States Patent
Aman et al.

(10) Patent No.: US 7,493,380 B2
(45) Date of Patent: Feb. 17, 2009

(54) METHOD FOR DETERMINING LOAD BALANCING WEIGHTS USING APPLICATION INSTANCE TOPOLOGY INFORMATION

(75) Inventors: Jeffrey David Aman, Poughkeepsie, NY (US); John E. Arwe, Poughkeepsie, NY (US); Michael Edward Baskey, Wappingers Falls, NY (US); John Alan Bivens, II, Ossining, NY (US); David Vincent Bostjancic, Poughkeepsie, NY (US); Donna N. Dillenberger, Yorktown Heights, NY (US); Peter Bergersen Yocom, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/725,635

(22) Filed: Dec. 2, 2003

(65) Prior Publication Data

US 2005/0120095 A1 Jun. 2, 2005

(51) Int. Cl.
*G06F 15/16* (2006.01)
(52) U.S. Cl. ..................... 709/223; 709/219
(58) Field of Classification Search ......... 709/217–219, 709/223–229, 238–248; 718/100–108
See application file for complete search history.

(56) References Cited

U.S. PATENT DOCUMENTS

| | | | | |
|---|---|---|---|---|
| 5,473,773 A | * | 12/1995 | Aman et al. | 718/104 |
| 5,603,029 A | * | 2/1997 | Aman et al. | 718/105 |
| 5,864,679 A | * | 1/1999 | Kanai et al. | 709/238 |
| 6,073,054 A | * | 6/2000 | Katayama et al. | 700/28 |
| 6,092,178 A | * | 7/2000 | Jindal et al. | 712/27 |
| 6,128,657 A | * | 10/2000 | Okanoya et al. | 709/224 |
| 6,249,800 B1 | * | 6/2001 | Aman et al. | 718/105 |
| 6,272,544 B1 | * | 8/2001 | Mullen | 709/226 |
| 6,324,580 B1 | * | 11/2001 | Jindal et al. | 709/228 |
| 6,327,622 B1 | * | 12/2001 | Jindal et al. | 709/228 |
| 6,370,584 B1 | * | 4/2002 | Bestavros et al. | 709/238 |
| 6,880,156 B1 | * | 4/2005 | Landherr et al. | 718/105 |
| 6,950,848 B1 | * | 9/2005 | Yousefi'zadeh | 709/203 |

(Continued)

OTHER PUBLICATIONS

Johnson "The Application Response Measurement API, Version 2" Tivoli Systems, Dec. 1997.*

*Primary Examiner*—Joseph E Avellino
(74) *Attorney, Agent, or Firm*—Duke W. Yee; Douglas W. Cameron; Gerald H. Glanzman

(57) ABSTRACT

An apparatus and method for distributing traffic across a group of machines using application instance statistics. In order to perform load balancing in accordance with the present invention, a method of generating weights to bias load balancing distributions is provided. The application instances to which traffic is being distributed, or the application middleware, are instrumented to establish certain metrics about the application while running. The application instance instrumentation will provide application statistics such as number of successful transactions, application response times, application topology, importance of transactions being processed, time the application is blocked waiting for resources, resource consumption data, and the like. These metrics are collected, processed, and then presented as a set of weights to the load balancing apparatus to govern its distribution of traffic. With such application metrics available, traffic can be disbursed based on the current state of the application instances and other application instances in the transaction's path, the application instance's likelihood to complete the request, or even higher level business-oriented goals.

7 Claims, 4 Drawing Sheets

U.S. PATENT DOCUMENTS

| | | | |
|---|---|---|---|
| 7,111,063 B1* | 9/2006 | Clark et al. | 709/225 |
| 7,181,527 B2* | 2/2007 | Valenci et al. | 709/234 |
| 2002/0019879 A1* | 2/2002 | Jasen et al. | 709/240 |
| 2002/0069279 A1* | 6/2002 | Romero et al. | 709/225 |
| 2002/0087694 A1* | 7/2002 | Daoud et al. | 709/226 |
| 2002/0133532 A1* | 9/2002 | Hossain | 709/105 |
| 2002/0138577 A1* | 9/2002 | Teng et al. | 709/205 |
| 2002/0178052 A1* | 11/2002 | Beyer et al. | 705/14 |
| 2004/0111725 A1* | 6/2004 | Srinivasan et al. | 718/105 |
| 2005/0050202 A1* | 3/2005 | Aiken et al. | 709/227 |
| 2005/0071307 A1* | 3/2005 | Snyder | 707/1 |
| 2005/0114429 A1* | 5/2005 | Caccavale | 709/200 |

* cited by examiner

METHOD FOR DETERMINING LOAD BALANCING WEIGHTS USING APPLICATION INSTANCE TOPOLOGY INFORMATION

BACKGROUND OF THE INVENTION

1. Technical Field

The present invention provides an improved computing system in which load balancing weights are determined using application instance data such as success ratios, response times, service class levels, and transaction topology. More specifically, the present invention relates to distributing traffic across a collective group of machines based on the current and previous knowledge gathered about the applications receiving and processing the traffic on those machines.

2. Description of Related Art

Load Balancers distribute load to a collection of machines to provide extended scalability and availability to applications. As a service becomes more popular, its ability to serve a larger number of requests becomes critical. One solution to this problem is to create copies of the service to which some of the requests can be sent. These copies also distribute the point of failure for an application because if one copy of the service fails, another may be available. The load balancer's job is to distribute the load across all available copies. The method in which the load balancer chooses to distribute the load can make a big difference on the overall effect seen by users of the service and the efficiency of the servers being used. Current methods used by load balancers to distribute the load include purely algorithmic methods, system-metric based methods, and "application-alive" checks.

The purely algorithmic methods include no information about the actual service or the likelihood that the service could complete the task in a particular time period (or complete the task at all). An example of some of these methods are round robin, weighted round robin, least connections, and hash methods. The round robin approach simply distributes the requests evenly to each server application instance, e.g. send the first request to the first server and then send the second request to the second server, wrapping around to the first server again once all of the servers have had a request sent to them. The weighted round robin approach is the same as the round robin approach but with static weights associated with particular servers to give preference to those servers. The least connections approach involves sending the new request to the server with the least number of open connections. The hash methods approach involves sending all requests which match some regular expression to a certain server.

System-metric based methods use statistics about the system on which the server is running in its decision making process. This information is useful, but may not be descriptive enough as the service itself may not be contributing to the system statistics in an intuitive manner. Other applications could distort the image portrayed by system-level statistics (e.g. CPU usage may be low because the load balanced application is waiting on a resource currently taken by another application). Even if the entire system only runs a single application, system statistics could paint an inaccurate picture of the current application state because the application dependencies may not be understood by the system. For example, the CPU usage and response time could also be low because the application is stuck in an error state and simply returns an "out of service" reply to every request. This problem, known as the "Storm Drain Problem," can be especially tough on a load balancing algorithm with no application-level statistics because the application appears to be functioning perfectly to the underlying system.

Application-alive checks determine if the application is functioning as part of the load balancing operation. For example, load balancers will not send traffic to an application that has either died or has malfunctioned. While these checks are application specific, they give no indication as to the degree of health the application may be experiencing besides dead or alive. In that sense, they offer no basis to compare two functioning servers to determine which server to send work to.

Thus, some of the known load balancing mechanisms use methods that have no relevance to the performance of the applications servicing the request. The other load balancing mechanisms, while loosely relevant, do not provide clear indications about how well an application has been, and will be, suited to handling particular requests. For example, the number of connections and other generic application attributes may be the affects of another application or part of the system. Generic resource usage statistics may also be misleading. For example, it may be desirable to send requests to a machine with high CPU usage, which would normally not be selected as the machine to which the request should be sent, if the machine's less important work were to be interrupted so that the request is to be processed.

Lastly, in the competitive market of application services, the system level and other non-application specific data used in current load balancing solutions do not constitute the type of monitoring necessary for business-level goals. For example, an SLA may have an agreement for transactions to successfully complete in a certain amount of time, or some compensation will be awarded. In this example, simple application-alive checks will not suffice. Thus, it would be beneficial to have an apparatus and method for performing load balancing based on weights that identify the best server/application instance(s) that is specific to the application instance and is not based on generic resource usage statistics.

SUMMARY OF THE INVENTION

The present invention provides an apparatus and method for distributing traffic across a group of machines using application statistics. In order to perform load balancing in accordance with the present invention, a method of generating weights to bias load balancing distributions is provided. The application instances to which traffic is being distributed are instrumented to establish certain metrics about the application instances while running. Application middleware may also be instrumented in lieu of application instrumentation. The instrumentation will provide application instance statistics such as number of successful transactions, application response times, application topology, importance of transactions being processed, time the application is blocked waiting for resources, resource consumption data, and the like. These metrics are collected, processed, and then presented as a set of weights to the load balancing apparatus to govern its distribution of traffic.

With such application instance metrics available, traffic can be disbursed based on the current state of the application instance and other application instances in the transaction's path, the application instance's likelihood to complete the request, or even higher level business-oriented goals. This will have the effect of a powerful, goal oriented, better utilized farm of computing devices. These and other features and advantages of the present invention will be described in, or will become apparent to those of ordinary skill in the art, in view of the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
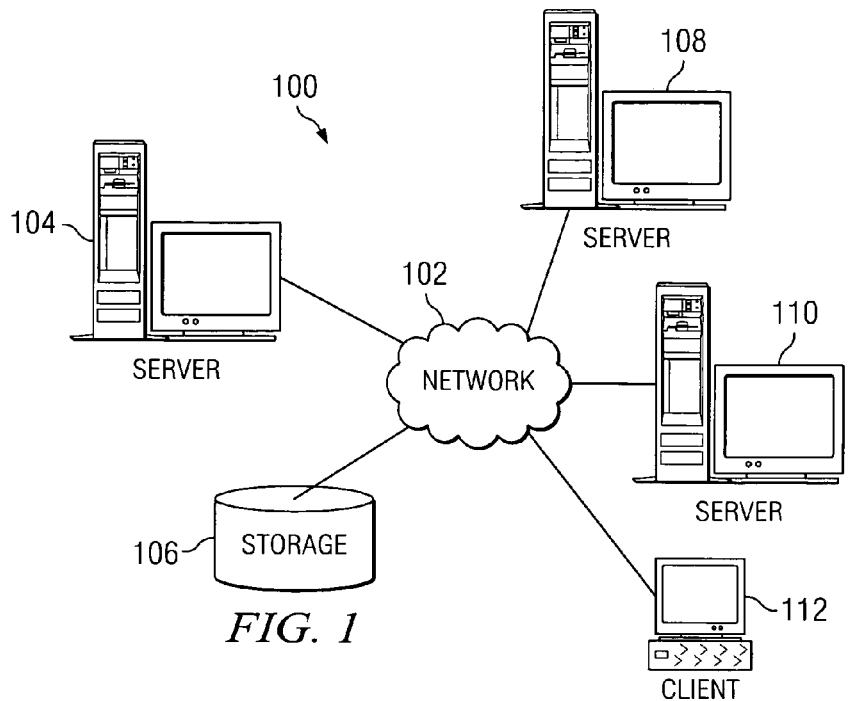
FIG. 1 is an exemplary diagram of a distributed data processing environment in which the present invention may be implemented.
Figure 2:
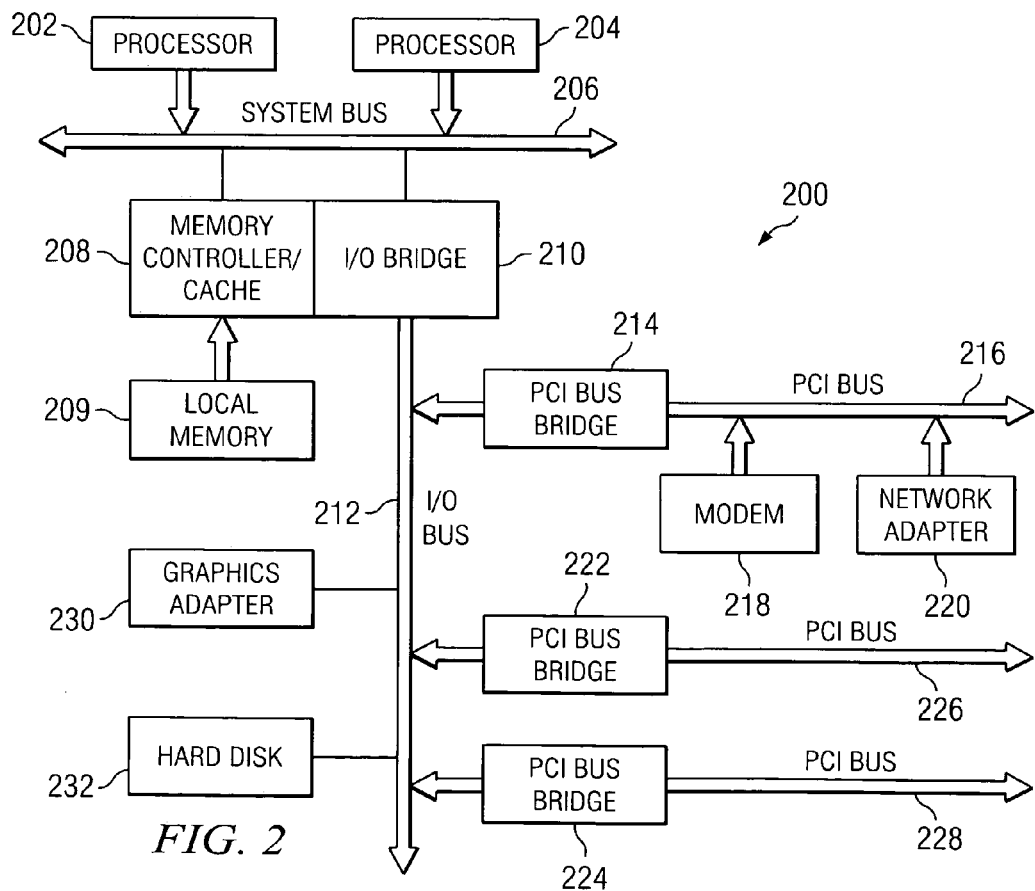
FIG. 2 is an exemplary diagram of a server computing device in which aspects of the present invention may be implemented.
Figure 3:
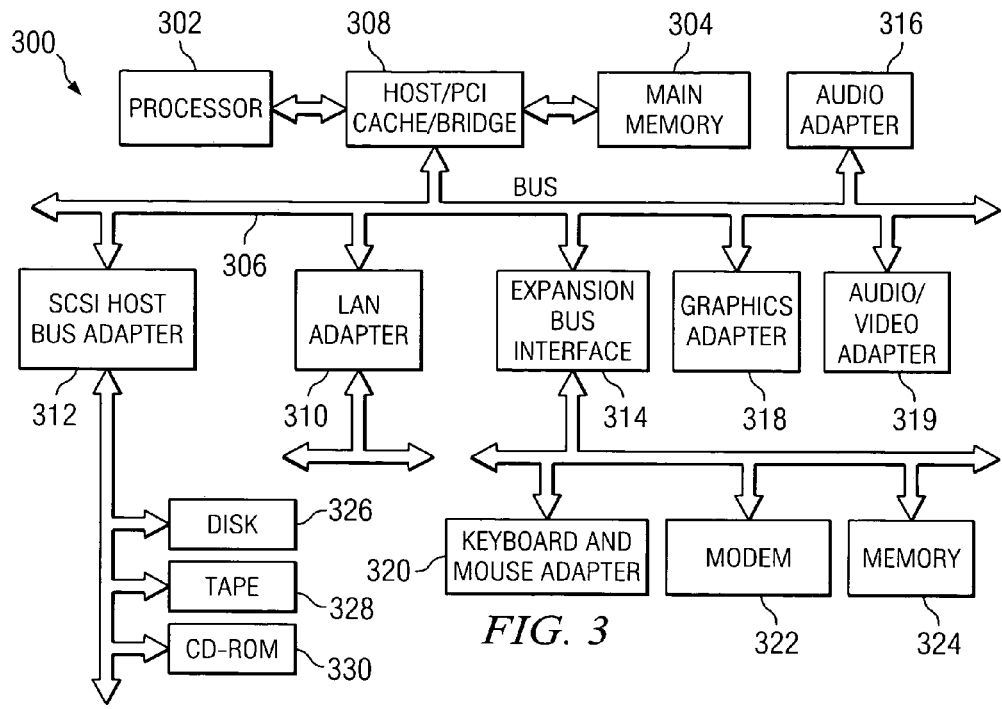
FIG. 3 is an exemplary diagram of a client computing device in accordance with an exemplary embodiment of the present invention.

The present invention is directed to a mechanism for performing load balancing of requests to application instances on one or more server computing devices. These requests may be generated by other servers, client computing devices, or other computing devices that may act as sources of requests for application resources on a server computing device. As such, the present invention is especially suited for use in a distributed data processing environment. Therefore, FIGS. 1-3 are provided hereafter to provide a general overview of an exemplary distributed data processing system, and the computing devices therein, in order to give a context for an exemplary environment in which the present invention may be implemented. No limitation on the environments in which the present invention may be utilized is intended or implied by the description and depictions of FIGS. 1-3.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 108 and 110 are connected to network 102 along with storage unit 106. In addition, client 112 is connected to network 102. Client 112 may be, for example, a personal computer or network computer. In the depicted example, servers 104, 108 and 110 provide data, such as boot files, operating system images, and applications to client 112. Client 112 may be a client to servers 104, 108 and 110, for example. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104, 108 or 110 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides an improved mechanism for performing load balancing amongst a plurality of application instances on the same or different computing devices. This load balancing may involve determining to which computing devices, e.g., servers 104, 108 and 110, a request is to be directed in order to distribute requests across a plurality of application instances. These requests may originate in computing devices that may be clients, such as client 112, or other server computing devices. The load balancing performed by the present invention is based on application instance statistics obtained from agent applications running on computing devices providing these application instance statistics. These agent applications provide statistical information about the application instances running on the computing devices to a weight management system that determines weights to be applied to the application instances based on the statistical information received. These weights may then be provided to a load balancing mechanism for use in determining how to perform load balancing with regard to incoming requests.

Figure 4:
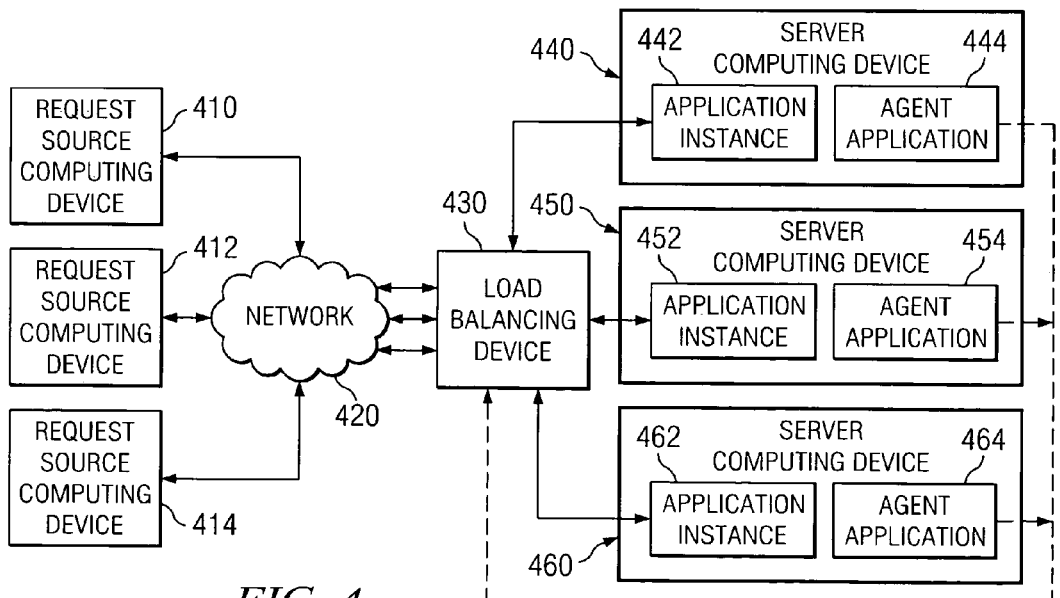
FIG. 4 is an exemplary diagram illustrating a traditional load balancing mechanism.

FIG. 4 is an exemplary diagram illustrating a traditional load balancing mechanism. As shown in FIG. 4, in the traditional load balancing approach, an application instance, e.g., application instance 442, is started so that it may execute transactions on a server computing device, e.g., server 440. To provide extended scalability and availability, the administrator of the servers 440, 450 and 460, i.e. a server farm, may choose to have multiple copies of this application, i.e. application instances 452 and 462, on the other server computing devices 450 and 460. In this way, a greater number of transactions may be handled by the application by spreading the transactions across three instances of the application on three different computing devices.

In order to make the application instances' different locations, i.e. on the different servers 440, 450 and 460, transparent to client computing devices and to distribute the transactions across the different computing devices 440, 450 and 460, a load balancing device 430 is provided. The load balancing device 430 represents the service offered via the application instances 442, 452 and 462 and acts as a forwarding agent for forwarding requests to the various application instances 442, 452 and 462. Thus, requests generated by request source computing devices 410-414 may be directed to the load balancing device 430, via the network 420 using an addressing technique, e.g., IP addresses, network addresses, etc., which then forwards these requests to various ones of the application instances 442-462 based on load balancing methodologies such as those described above in the Background of the Invention section of this document.

As previously discussed above in the Background of the Invention section of this document, known load balancing techniques include purely algorithmic methods, system-metric based methods, and "application-alive" checks. If the load balancing device 430 is using a purely algorithmic method of load balancing to determine which server computing device 440, 450 or 460 to send a request to, the load balancing device 430 makes an effort to distribute the requests evenly across the server computing devices 440, 450 and 460, such as with round-robin load balancing. Alternatively, using purely algorithmic methods, the load balancing device 430 may attempt to distribute requests according to a static preset distribution, e.g. a weighted round robin or hash method load balancing technique.

For example, if the load balancing device 430 were using a simple round robin algorithm, the load balancing device 430 would send a first received request to the application instance 442 on server computing device 440. A second received request would then be sent to application instance 452 on server computing device 450. A third received request would be sent to application instance 462 on server computing device 460. If a fourth request is received, the round robin load balancing technique would wrap around to server computing device 440 again such that the fourth received request is sent to application instance 442 on server computing device 440. Thus, the purely algorithmic methods do not take into account the operational conditions of the server computing devices or the application instances and, as the name implies, are purely based on a static algorithm that determines where to route requests regardless of the current operational conditions of the server computing devices or application instances.

The purely algorithmic methods of load balancing do not require any information regarding the operational conditions of the computing devices. However, in some known load balancing techniques, such as system metric based load balancing techniques, information about the operational condition of the computing devices 440, 450 and 460 are used to influence the manner by which the load is balanced across these computing devices. With such techniques, agent applications 444, 454 and 464 are provided on each of the server computing devices 440, 450 and 460 to gather system-based operational information which these agents then pass to the load balancing device 430. The load balancing device 430 then uses this information to determine how to route incoming requests based on a judgment as to which server computing device is the "best" computing device for handling the requests.

Figure 5:
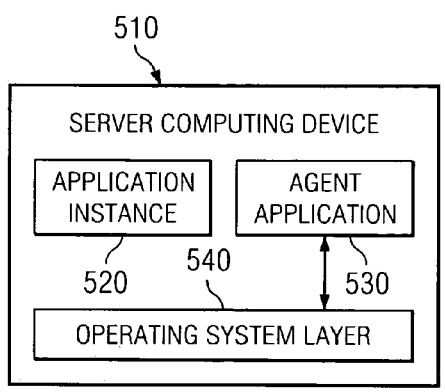
FIG. 5 is an exemplary diagram of a server computing device in which a system statistics agent is utilized to obtain statistics about the overall server system operation.

FIG. 5 is an exemplary diagram of a server computing device in which a system statistics agent is utilized to obtain statistics about the overall server system operation. The server depicted in FIG. 5 may be a server computing device such as those shown in FIG. 4, i.e. server computing devices 440, 450 and 460. As shown in FIG. 5, the server computing device 510 includes an application instance 520, an agent application 530, and an operating system layer 540. The agent application 530 communicates with the operating system layer 540 of the server computing device 510 in order to obtain general system statistics information. Examples of such general system statistics information include system central processing unit (CPU) utilization, available system memory, available disk space, number of connections, and the like. These general system statistics are obtained by the agent application 530 from the operating system layer 540 and are sent to the load balancing device for use in determining how to perform load balancing of incoming requests directed to an application, of which application instance 520 is one instance.

The problem with using general system statistics, as previously noted above, is that they may not accurately reflect the load on a particular application running on the system for which the general system statistics are obtained. For example, while the CPU utilization may be low, and thus it would seem that this server computing device should be preferred over others when performing load balancing, the bottleneck in processing transactions may be in the input/output (I/O) system or a network interface card. Similarly, just because the CPU utilization may be high does not necessarily mean that the system should be unavailable for more incoming requests, i.e. traffic. If all of the transactions being processed on a server computing system with high CPU utilization are of a low priority, the load balancing device may want to send a high priority job or request to this server computing system since the high priority job will preempt the low priority transactions and will be processed first. Other similar examples illustrating the fact that general system statistics themselves may not be accurate predictors for load balancing exist, but in the interests of brevity will not be discussed in detail herein.

The present invention solves the problems associated with using general system statistics in the manner used in the known methodologies by instrumenting application instances to communicate with agent applications and provide application instance specific operational information which may then be used to calculate or adjust weights applied to these server/application instance pairs during load balancing. That is, the application instances are instrumented by adding hooks or traps to the code of the application which causes an interrupt to be generated and sent to an interrupt handler. The interrupt handler, in response to receiving these interrupts, gathers application instance operational characteristics which are then sent to the agent application. Alternatively, the interrupt handler itself may be part of the agent application.

In an alternative embodiment, in lieu of instrumenting the application itself, middleware between the application instance and the agent applications may be instrumented for obtaining the necessary application instance operational information. That is, middleware that provides a communication capability between the application instance and the agent applications may be provided in which instructions are provided to communicate application instance operational information from the application instance to the agent application, which may process and/or forward this information to a weight management system for use in load balancing.

In either embodiment, the agent application may store the application instance specific information in a data structure associated with the agent application. Either immediately, periodically, or based on a received request from a weight management system, the agent application provides the stored application instance specific information to the weight management system which uses this information to generate or update one or more weights to be applied to the application instance during load balancing.

Figure 6:
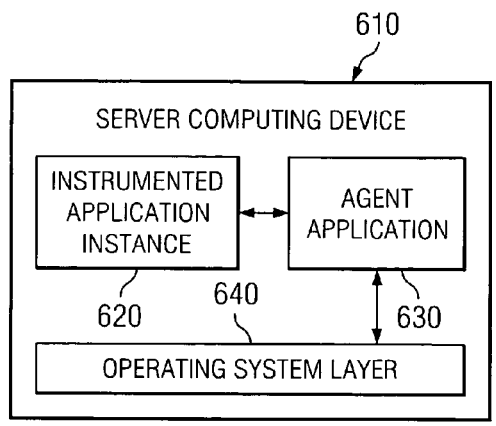
FIG. 6 is an exemplary diagram of an exemplary embodiment of a server computing device in which an application instance agent is utilized in accordance with an embodiment of the present invention.

FIG. 6 is an exemplary diagram of an exemplary embodiment of a server computing device in which an application instance agent is utilized in accordance with an embodiment of the present invention. As shown in FIG. 6, the server computing device 610 has an instrumented application instance 620, an agent application 630, and an operating system layer 640. As with the known mechanism shown in FIG. 5, the agent application 630 may obtain general system-based information from the operating system layer 640 regarding the operational condition of the system as a whole. However, in addition to, or instead of, obtaining the general system-based information, the agent application 630 of the present invention obtains application instance specific information from the instrumented application instance and stores this information for transmission to a weight management system.

The agent application 630 may obtain this application instance specific information via an interrupt handler or directly from the instrumented application instance 620. For example, the agent application 630 may obtain the application instance specific information using an application program interface (API), a socket, or other known communication technique. Other mechanisms to manage receiving the application instance specific information may include obtaining this application instance specific information through another entity. For example, the application instance instrumentation may place the application instance specific information in an operating system to be retrieved later by the agent application by some of the methods previously mentioned, e.g., API, socket, etc.

The type of application instance specific information obtained using the agent application of the present invention may be of many different types. Examples of such information include the number of successful transactions processed by the application instance, application response time, application topology, importance of transactions being processed, time the application is blocked waiting for resources, resource consumption data, and the like. In order to obtain this information, raw measured metric values may be converted to values representing the above application instance specific information. This conversion may be performed by agent applications or the weight management system, based on predetermined relationships between the raw measured metric values and/or established thresholds.

The number of successful transactions processed may be a raw number of transactions per period of time, e.g., 100 transactions per second or the like. This information may be obtained by maintaining a counter that counts the number of transactions for a predetermined period of time and is reinitialized at the end of the predetermined period of time. The application response time may be determined by calculating a difference between a timestamp associated with receipt of a request and a timestamp associated with the sending of a response to the request. The application topology may be obtained by determining if transactions must be passed along to other applications to be processed.

One way in which the application topology may be identified is through the use of a correlation, e.g., a flag or identifier, in the request sent from one application instance to another. The agent application of the second application receives the request, and the correlation, from the first application and determines that the first application must pass transactions along to the second application. This information may be conveyed to the weight management system such that the application instance information provided by the agent application associated with the second application instance is utilized when performing load balancing with respect to the first application instance.

The importance of transactions being processed by the application instance can be determined by compiling a listing of the priority values assigned to transactions received and/or completed by the application instance. Note that an application instance may service transactions at a variety of importance levels. Non-instrumented applications may still provide classification information if used with a "SHIM classification layer" which can classify the work coming into an application based on TCP/IP header and packet viewable contents.

The time that the application is blocked waiting for resources may be determined from a time stamp at when the application is placed in an idle state and a time stamp as to when the application is allowed to exit from the idle state or alternatively from a time at which a request is sent to the resource and a time when a response from the resource is received. The resource consumption data may be obtained by measuring the number of processor cycles utilized, the amount of memory the application instance and the application's data are consuming, the number of bytes sent or received by the network interface on the application's behalf, the number of connections accepted and maintained by the application, or other measure of a resource consumed, in performing operations for the application instance.

As previously mentioned, this application instance specific information is gathered by the agent application 630 and then may be stored in a data structure (not shown) associated with the agent application 630. The agent application 630 may either immediately, periodically, or upon request from a weight management system, provide this information to a weight management system for use in determining weights to be applied to the server/application instance pair entry in a load balancing operation. The weight management system is responsible for collecting the application instance specific information for all agent applications in a group of computing devices and generating weights based on the application instance specific information for each of these agent applications. The weight management system has the benefit of obtaining the application instance specific information from each of the agent applications and then making decisions as to the relative differences between two or more application instance operational states. Based on this relative difference, relative weights may be generated and provided to a load balancing system for routing requests based on a load balancing mechanism.

Figure 7:
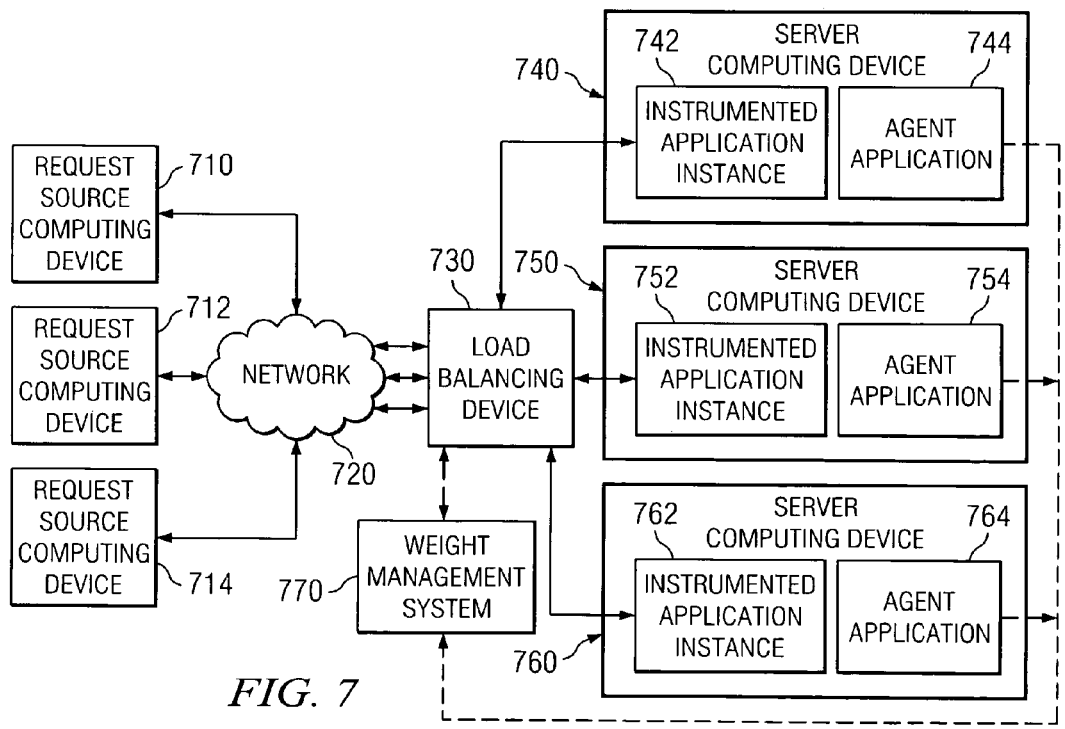
FIG. 7 is an exemplary diagram of a load balancing mechanism in accordance with an exemplary embodiment of the present invention.

FIG. 7 is an exemplary diagram of a load balancing mechanism in accordance with an exemplary embodiment of the present invention. The mechanism illustrated in FIG. 7 differs from that depicted in FIG. 4 in a number of important ways. First, while both mechanisms include agent applications, e.g., agent applications 744, 754 and 764, for the server computing devices 740, 750 and 760, the operation of the agent applications are different between the mechanism of FIG. 4 and that of FIG. 7. Specifically, the agent applications 744, 754, and 764, in addition to, or instead of, obtaining general system-based information, obtains application instance specific information from instrumented application instances 742, 752 and 762, respectively.

As a second important distinction over the mechanism shown in FIG. 4, the mechanism of FIG. 7 includes a weight management system 770 which communicates with the agent applications 744, 754, and 764 and the load balancing device 730. The weight management system 770 receives application instance specific information from the agent applications 744, 754 and 764, and may also obtain general system-based information from these agents, and calculates relative weights to be associated with each of the instrumented application instances 742, 752 and 762 based on this information. The relative weights are then provided to the load balancing device 730, either immediately, periodically, or upon a request from the load balancing device 730, for use in performing load balancing operations.

In determining relative weights to be applied to server/application instance pairs, the weight management system 770 makes a number of relative determinations based on the application instance specific information, and optionally the general system-based information, to generate an overall weight for the server/application instance pairs. The first determination is to identify any systems that have been deemed to be unreachable. The term "unreachable" means that communication with an application instance is not possible due to a current operational condition of the application instance. This current operational condition may be, for example, the server computing system having failed, the application instance being quiesced, the application instance having a severe paging rate or critical memory shortage, or the like.

A failed computing system may be identified by the fact that the weight management system cannot contact the agent application associated with the application instance or if it detects that no process is bound to a port associated with the application instance on that server computing system. Whether an application instance has been quiesced or not may be determined from information provided to the weight management system by the load balancing device or an administrator. The detection of a severe paging rate or critical memory shortage may be made by the agent applications based on the raw application instance specific information received and preestablished thresholds regarding these metrics.

For example, if an agent application 744 on a server computing device 740 does not return application instance specific information within a predetermined period of time, it may be determined that the server computing device 740 is not operational. Those server/application instances that are not reachable are given a weight of zero and thus, are removed as options for load balancing, i.e. no requests will be sent to application instances on server computing devices that are unreachable.

The weights for all other application instances on reachable server computing devices are then initialized to a base value. The weight management system 770 then determines relative valuations of various categories of application instance specific operational states and increases the weights associated with application instances based on these relative valuations. For example, the weight management system 770 may first increase weights of application instances based on a transaction success rate, i.e. number of successful transactions divided by total number of transactions for a predetermined period of time. Weights may also be increased based on the relative best response times of application instances. That is more weight is given to application instances with higher transaction success rates and better response times.

Similarly, weights may be increased based on whether the application instance is running on a system with additional capacity (underutilized systems). Meaningful capacity metrics may be generated by benchmarking techniques, learning techniques, or set by an administrator according to hardware specifications. In a preferred embodiment, the present invention learns the system capacity by statistically modeling the current workload. The amount of available system capacity can be computed by determining where the current usage is in the model and comparing it with the upper limit of the model. A higher quantity of available system capacity generates a larger increase in weight that is to be attributed to the application instance on that server computing system.

In addition to the above, weights for application instances with best response times that are on overutilized systems are increased. This increase in weight is based on a ranking of available capacity and the lowest importance level transactions being processed. That is, the more available capacity, the higher the increase in weights. The lower the importance level of the transactions being processed by the application instance, the higher the increase in weights.

Also, weights are increased for application instances processing the least important transactions. This is because the higher priority requests may enter these application instances and pre-empt the lower priority transactions. Thus, those application instances handling the lowest priority transactions will have their weights increased more than application instances that are handling middle to high priority transactions.

Moreover, the present invention may increase the weights of all application instances whose transactions typically go on to high performing systems. That is, if a transaction requires multiple hops to other computing systems before being completed, it must be determined whether the other computing systems operate at high performance or not. There is no point in favoring an application instance if the application instance always hands the transaction off to a separate application that is performing poorly.

The manner by which the actual weight value increases to be applied are calculated may take many different forms. For example, a predetermined number of "points" may be associated with a particular criterion with the "points" being distributed based on a ranking of the application instances relative to one another. For example, the highest ranked application instance receives 40% of the available points, the lowest ranked application instance receives 10% of the available points, with the remaining points being distributed to the other application instances according to their ranks. Alternatively, a straight percentage of the available points may be applied based on a difference in criterion value from a lowest or highest criterion value. Other methods of attributing increases in weights may be used without departing from the spirit and scope of the present invention.

In other embodiments, each application instance may be ranked according to a single criteria point and a corresponding normalized distribution of the application instances is developed. After this is done for each criteria point, all of the normalized distributions are statistically combined to form a general distribution. Weight points may then be distributed according to this statistically formed generalized distribution.

Thus, using the above criteria, the weights associated with particular server/application instance pairs are adjusted to obtain a relative weighting of the server/application instances for use in load balancing. Other criteria may be utilized in conjunction with, or in replacement of, one or more of the criteria mentioned above without departing from the spirit and scope of the present invention. The primary concern is that the criteria be centered around the operational condition of the application instance on the computing device rather than only on the general statistics of the operations of the computing device as a whole.

Figure 8:
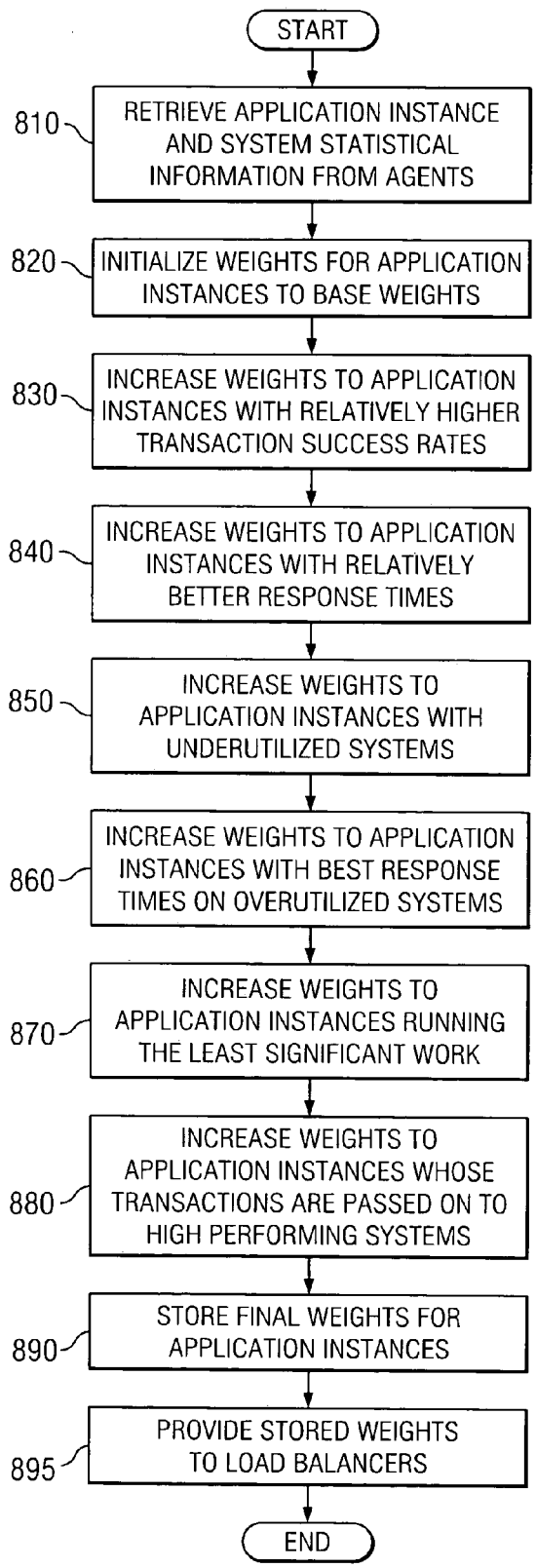
FIG. 8 is a flowchart outlining an exemplary operation of the present invention when determining application instance weights to be applied to a load balancing operation.
Figure 9:
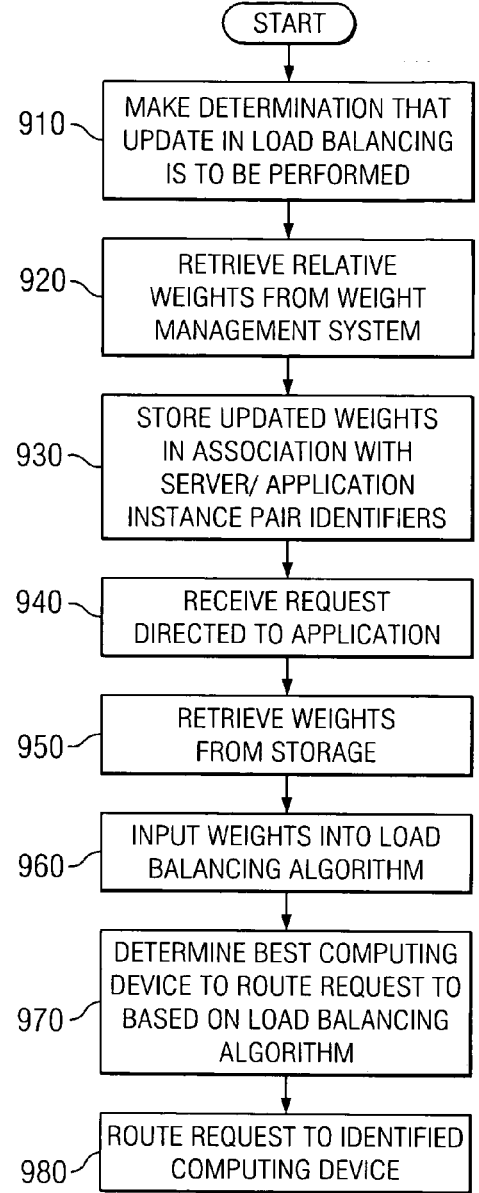
FIG. 9 is a flowchart outlining an exemplary operation of the present invention when performing load balancing based on the application instance weights.

FIGS. 8 and 9 are flowcharts that illustrate the generation and use of application instance weights in accordance with an exemplary embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 8 is a flowchart outlining an exemplary operation of the present invention when determining application instance weights to be applied to a load balancing operation. As shown in FIG. 8, the operation starts by retrieving application instance and system statistical information from agent applications (step 810). Weights are initialized to base weights for the application instances (step 820). This initialization may further include setting the weights for unreachable application instances to zero as discussed above.

Thereafter, weights for application instances are increased based on a relative comparison of transaction success rates such that relatively higher transaction success rates are increased by a relatively larger amount than lower transaction success rates (step 830). Weights for application instances with relatively better response times are then increased based on the relative measure of these response times (step 840). The weights of application instances running on underutilized systems may then be increased relative to application instances that are running on systems that are more utilized (step 850). Further, the weights of application instances with the best response times running on overutilized systems are increased relative to other application instances (step 860).

The weights of application instances running the least significant work are increased relative to application instances running more significant work (step 870). Thereafter, weights associated with application instances whose transactions are passed on to high performing systems are increased relative to application instances whose transactions are not passed on or are passed on to lower performing systems (step 880). After having modified the weights associated with the server/application instances from base weight values in the above manner, the final weights for the server/application instance pairs are stored in a data structure (step 890). Either immediately thereafter, at a predetermined time, or upon receipt of a request, the stored weights may then be provide to one or more load balancer devices for use in load balancing (step 895). The operation then terminates.

FIG. 9 is a flowchart outlining an exemplary operation of the present invention when performing load balancing based on the application instance weights generated by the present invention. As shown in FIG. 9, the operation starts by determining that an update in the load balancing is to be performed (step 910). This determination may be made, for example, based on a predetermined period of time since a last update of the load balancing weights or a notification that updated load balancing weights are now available from the weight management system. The relative weights for the application instances of a group of computing devices are then retrieved from the weight management system (step 920). The weights are stored in association with identifiers of the server/application instance pairs (step 930).

Upon receiving a request for a service or function performed by the application (step 940), the weights are retrieved (step 950) and input to a weighted load balancing algorithm (step 960). From the weighted load balancing algorithm, a determination as to the best computing device in the group of computing devices to which the request should be routed is determined (step 970). The request is then routed to the identified computing device (step 980) and the operation terminates.

Thus, the present invention provides a mechanism for providing relative weights for use in load balancing which are based on operational conditions of individual application instances rather than based on general statistics of computing devices. In this way, a more accurate determination of the best application instance for handling a request may be identified such that the load on the overall group of computing devices is most efficiently distributed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, of distributing traffic to application instances on one or more computing devices, comprising:

obtaining application instance specific operational information identifying operational characteristics of an application instance on a computing device of the one or more computing devices, wherein the application instance specific operational information includes an application instance topology;

comparing the application instance specific operational information to one or more other application instance specific operational information for one or more other application instances based on the application instance specific operational information obtained;

generating a load balancing weight based on a relationship between the application instance specific operational information and the one or more other application instance specific operational information;

attributing weight points to the application instance and the one or more other application instances based on a relative difference between the application instance specific operational information and the one or more other application instance specific operational information;

providing the load balancing weight to a load balancing device;

the load balancing device distributing the traffic to the application instance based on the load balancing weight;

wherein obtaining application instance specific operational information includes retrieving the application instance specific operational information from the application instance using an agent application residing on the computing device, and wherein the agent application identifies the application instance topology by sending a correlation in a request to an agent application associated with a second application instance, wherein application instance information is provided by the agent application associated with the second application; and wherein the method is implemented in a weight management system that is separate from the computing devices and from the load balancing device.

2. The method of claim 1, wherein the application instance is instrumented to include code for communicating with the agent application and sending the application instance specific operational information to the agent application from the application instance.

3. The method of claim 1, wherein the relationship is a relative difference between the application instance specific operational information and the one or more other application instance specific information.

4. The method of claim 1, wherein retrieving the application instance specific operational information from the agent application is performed periodically.

5. The method of claim 1, wherein generating the load balancing weight based on the relationship between the application instance specific operational information and the one of more other application instance specific information includes:
- assigning a base weight to each of the application instance and the one or more other application instances; and
- increasing a weight value associated with the application instance or the one or more other application instances based on one or more of the following:
- which of the application instance and the one or more other application instances has a relatively higher transaction success rate;
- which of the application instance and the one or more other application instances operates on an underutilized system;
- which of the application instance and the one or more other application instances processes the least significant transactions; and
- which of the application instance and the one or more other application instances passes transactions on to higher performing computing systems.

6. The method of claim 1, wherein generating the load balancing weight based on the relationship between the application instance specific operational information and the one of more other application instance specific information includes:
- assigning a base weight to each of the application instance and the one or more other application instances; and
- increasing a weight value associated with the application instance or the one or more other application instances based on which of the application instance and the one or more other application instances processes the least significant transactions.

7. The method of claim 1, wherein generating the load balancing weight based on the relationship between the application instance specific operational information and the one of more other application instance specific information includes:
- assigning a base weight to each of the application instance and the one or more other application instances; and
- increasing a weight value associated with the application instance or the one or more other application instances based on which of the application instance and the one or more other application instances passes transactions on to higher performing computing systems.

* * * * *